US012616097B2

(12) United States Patent
Smith et al.

(10) Patent No.: US 12,616,097 B2
(45) Date of Patent: May 5, 2026

(54) ROBOTIC HARVESTING SYSTEM FOR VERTICAL PLANT CULTIVATION

(71) Applicant: MJNN LLC, South San Francisco, CA (US)

(72) Inventors: Damon Smith, Laramie, WY (US); Kevin Grauberger, Laramie, WY (US); Aunders Hallsten, Cheyenne, WY (US); Nathaniel R. Storey, Laramie, WY (US); Lucas Woodbury, Laramie, WY (US); Paul Kreiner, South San Francisco, CA (US)

(73) Assignee: MJNN LLC, South San Francisco, CA (US)

( * ) Notice: Subject to any disclaimer, the term of this patent is extended or adjusted under 35 U.S.C. 154(b) by 497 days.

(21) Appl. No.: 18/027,342

(22) PCT Filed: Sep. 21, 2021

(86) PCT No.: PCT/US2021/051282
§ 371 (c)(1),
(2) Date: Mar. 20, 2023

(87) PCT Pub. No.: WO2022/061288
PCT Pub. Date: Mar. 24, 2022

(65) Prior Publication Data
US 2023/0397536 A1     Dec. 14, 2023

Related U.S. Application Data

(60) Provisional application No. 63/081,273, filed on Sep. 21, 2020.

(51) Int. Cl.
*A01D 46/30*        (2006.01)
*A01G 31/04*        (2006.01)

(52) U.S. Cl.
CPC ........... *A01D 46/30* (2013.01); *A01G 31/045* (2013.01)

(58) Field of Classification Search
CPC .............................. A01D 46/30; A01G 31/045
See application file for complete search history.

(56) References Cited

U.S. PATENT DOCUMENTS 2,244,677 A      6/1941   Cornell
4,113,065 A  *   9/1978   Sikli ..................... B66F 11/042
                                              187/269

(Continued)

FOREIGN PATENT DOCUMENTS

EP            0610137 B1    12/1997
WO     WO-2020055228 A1  *  3/2020    ............. A01D 46/20
WO        2020/092503 A1    5/2020

OTHER PUBLICATIONS

Definition of "boustrophedonic", retrieved by Examiner from https://www.merriam-webster.com/dictionary/boustrophedonic on Aug. 18, 2025 (Year: 2025).*

(Continued)

*Primary Examiner* — Claude J Brown
(74) *Attorney, Agent, or Firm* — Patterson + Sheridan, LLP

(57)        ABSTRACT

The present disclosure relates to apparatuses for plant harvesting. More specifically, apparatuses for harvesting vertically grown fruit (620), plants, or vegetables are described herein. In one embodiment a harvesting system includes a grow line (100, 102) and one or more grow towers (150) coupled to and moveable along the grow line (100, 102). A plurality of platforms (306) are disposed adjacent to the grow towers (150) and include one or more robots (302) disposed on the platforms (306). Embodiments of the disclosure also provide for harvesting tools (600), such as robot (Continued)

(203, 302, 508) end effectors (304) for harvesting one or more types of produce.

15 Claims, 6 Drawing Sheets

(56) References Cited

U.S. PATENT DOCUMENTS

| | | | |
|---|---|---|---|
| 8,056,677 B1 * | 11/2011 | Roberts | B66F 11/04 |
| | | | 280/6.154 |
| 8,418,403 B1 | 4/2013 | Nuttman | |
| 10,136,587 B1 | 11/2018 | Johnson et al. | |
| 10,225,994 B1 | 3/2019 | Johnson et al. | |
| 10,750,675 B2 | 8/2020 | Matera et al. | |
| 11,369,063 B2 | 6/2022 | Johnson et al. | |
| 2011/0120002 A1 * | 5/2011 | Pettibone | A01G 31/042 |
| | | | 47/65 |
| 2015/0173296 A1 | 6/2015 | Wafler et al. | |
| 2015/0223418 A1 | 8/2015 | Collins et al. | |
| 2016/0014977 A1 | 1/2016 | Esaki et al. | |
| 2018/0022551 A1 * | 1/2018 | Gondoh | G06Q 10/0832 |
| | | | 700/215 |
| 2018/0146618 A1 * | 5/2018 | Elazary | A01D 46/30 |
| 2018/0359976 A1 * | 12/2018 | Millar | A01G 9/085 |
| 2019/0261566 A1 * | 8/2019 | Robertson | G06T 7/50 |
| 2019/0307077 A1 | 10/2019 | Lert, Jr. et al. | |
| 2020/0329654 A1 * | 10/2020 | Westlind | A01G 31/065 |

OTHER PUBLICATIONS

International Search Report and Written Opinion, PCT/US2021/051282, Dec. 20, 2021.

* cited by examiner

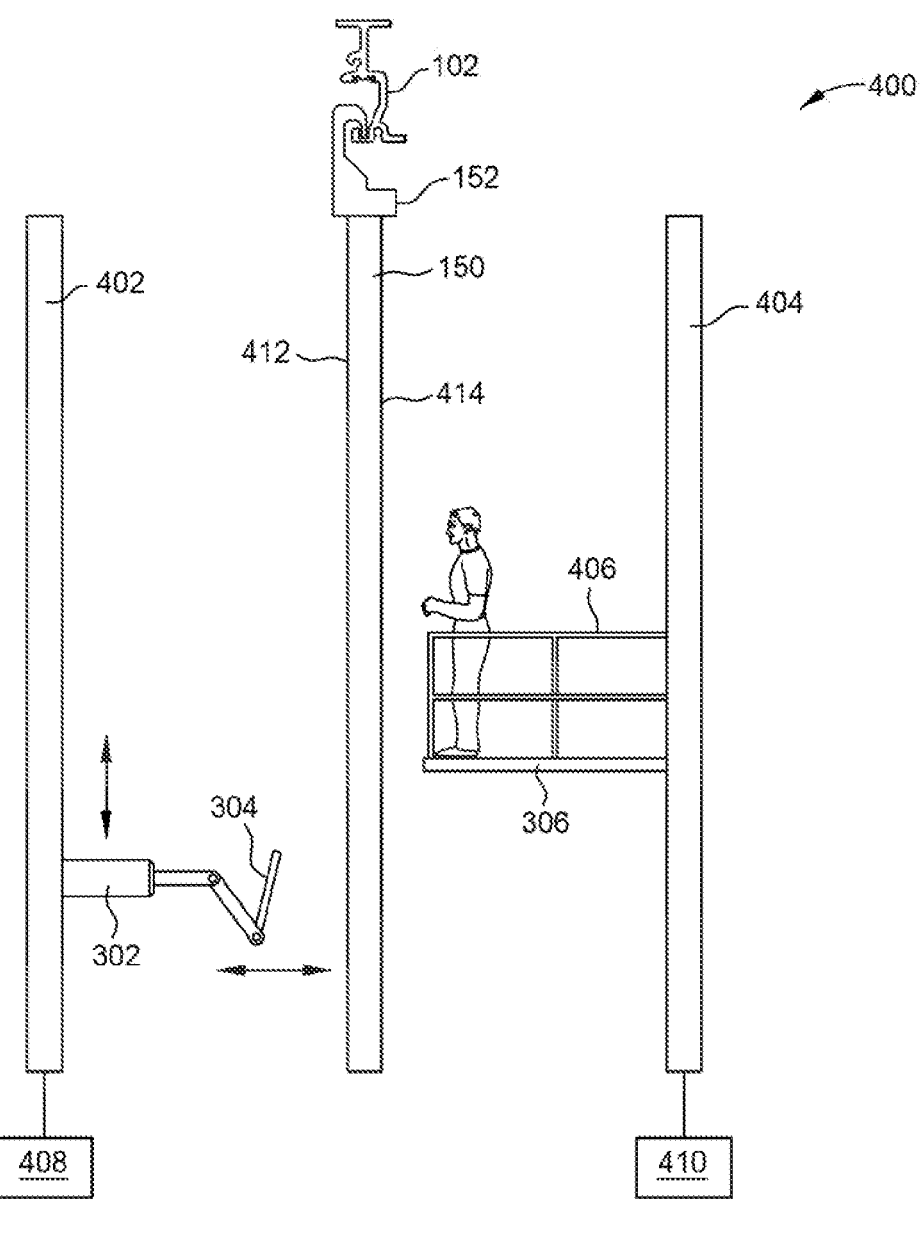
FIG. 4
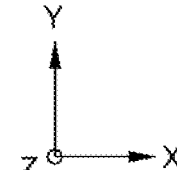

ROBOTIC HARVESTING SYSTEM FOR VERTICAL PLANT CULTIVATION

BACKGROUND

Field

Embodiments of the present disclosure generally relate to apparatus and methods for plant and fruit harvesting.

Description of the Related Art

During the twentieth century, agriculture slowly began to evolve from a conservative industry to a fast-moving high-tech industry in order to keep up with world food shortages, climate change, and societal changes moving away from manually-implemented agriculture techniques increasingly toward computer implemented technologies. In the past, and in many cases still today, farmers only have one growing season to produce the crops which ultimately determines their revenue and food production for the entire year. However, recent advances have disrupted conventional farming and food production practices. As indoor agriculture becomes more viable and increasingly employs data processing technologies and other advanced techniques, the science of agriculture has become more agile and is adapting and learning as new data is collected and insights are generated.

Conventional agricultural practices rely upon the availability of arable land, but are subject to various environmental pressures, such as drought, pest, and disease pressures. Advancements in technology have led to the advent of controlled indoor agriculture. Improved efficiencies in space utilization, lighting, and a better understanding of hydroponics, aeroponics, crop cycles, and advancements in environmental control systems have allowed humans to create environments that are more conducive for agriculture to increase yields per square foot, nutrition, and other desirable produce characteristics, such as taste, color, etc.

One aspect of controlled indoor agriculture is the utilization of a vertical growth architecture where plants are grown adjacent to one another along a substantially common vertical axis. Plants grown in such a vertical architecture are "stacked" on top of one another. While vertical growing architectures reduce the amount of land area utilized for crop production, challenges exist with the harvesting of certain plants and crop types. For example, growth, size, and fruiting characteristics of certain crop types may adversely impact harvesting techniques for vertical growth architectures.

Accordingly, there is a need in the art for improved apparatus and methods for plant harvesting.

SUMMARY

In one embodiment, a harvesting system is provided. The system includes a grow line, one or more towers coupled to the grow line and moveable along the grow line, a plurality of platforms disposed adjacent to the grow towers, and one or more robots disposed on each of the platforms.

In another embodiment, a harvesting system is provided. The system includes a grow line having a plurality of vertically oriented grow towers coupled to the grow line, a first plurality of platforms positioned adjacent to a first region of the grow line and each platform of the first plurality of platforms have one or more first robots disposed thereon. A second plurality of platforms is positioned adjacent to a second region of the grow line and each platform of the second plurality of platforms has one or more second robots disposed thereon. A third plurality of platforms is positioned adjacent to a third region of the grow line and each platform of the third plurality of platforms has one or more third robots disposed thereon. Each robot of the first, second, and third robots are positioned to harvest a different region of the grow towers.

In another embodiment, a harvesting system is provided. The system includes a grow line having a plurality of vertically oriented grow towers coupled to the grow line and each grow tower of the plurality has a first face and a second face oriented opposite the first face. A first support column is disposed adjacent to the first face of the grow towers, a second support column is disposed adjacent to the second face of the grow towers, a first robot is coupled to the first support column, and a second robot is coupled to the second support column.

In another embodiment, a harvesting system is provided. The system includes a grow line having a plurality of vertically oriented grow towers coupled to the grow line and each grow tower of the plurality has a first face and a second face oriented opposite the first face. A first support column is disposed adjacent to the first face of the grow towers, a second support column is disposed adjacent to the second face of the grow towers, a first platform is coupled to the first support column, and a second platform is coupled to the second support column.

In another embodiment, a harvesting tool apparatus is provided. The apparatus includes a body having a base member and at least two arms extending from the base member. The arms define an opening therebetween. A coupling portion extends from the base member opposite the arms and a blade is coupled to the body and extends across the opening from a first arm to a second arm of the at least two arms.

In another embodiment, a harvesting tool apparatus is provided. The apparatus includes a base member and a plurality of arms extending form the base member. The plurality of arms are fabricated from a material having a first elasticity. A coupling portion extends from the base member opposite the plurality of arms and a plurality of fingers extend from the base member and are disposed between the plurality of arms. The plurality of fingers are fabricated form a material having a second elasticity greater than the first elasticity.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 4 illustrates an end view of a vertical harvesting system according to an embodiment of the disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to apparatus and methods for plant harvesting. More specifically, apparatus and methods for harvesting vertically grown fruits, plants, or vegetables are described herein. In one embodiment, a harvesting system includes a grow line and one or more grow towers coupled to and moveable along the grow line. A plurality of platforms are disposed adjacent to the grow towers and include one or more robots disposed on the platforms. Embodiments of the disclosure also provide for harvesting tools, such as robot end effectors for harvesting one or more types of produce.

Figure 1:
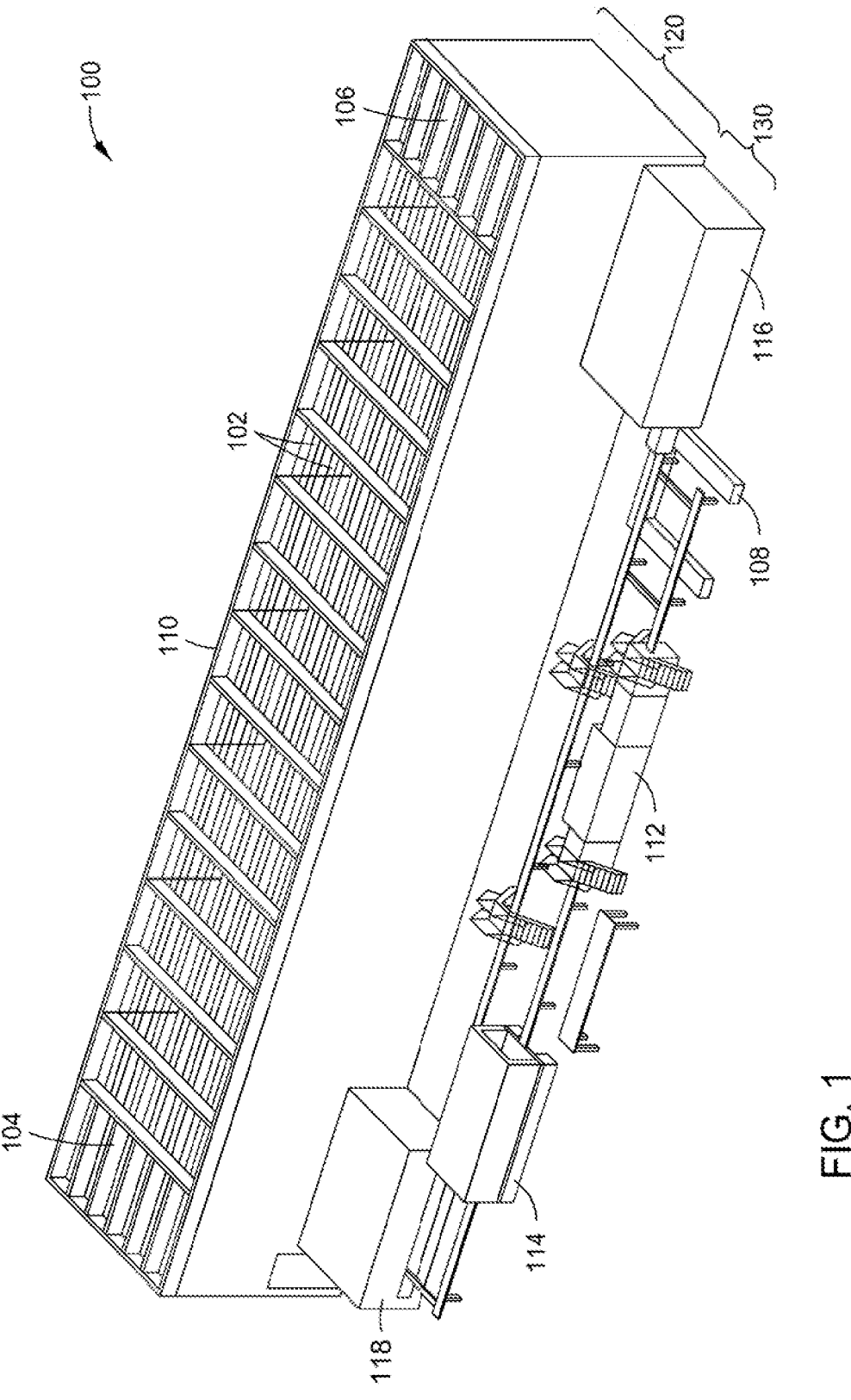
FIG. 1 illustrates a schematic perspective view of a controlled environment agriculture system according to an embodiment of the disclosure.

FIG. 1 illustrates a schematic perspective view of a controlled environment agriculture system 100. The system 100 is configured for high-density growth and crop yield and includes an environmentally controlled growing chamber 120 and a vertical tower conveyance system 110 disposed within the growing chamber 120. The conveyance system 110 is operable to convey grow towers 150, described in greater detail with respect to FIG. 2, with crops/plants therein through the growing chamber 120. The crops or plants grown within the system 100 exhibit gravitropic, geotropic, and/or phototropic growth characteristics. The crops or plants vary considerably and include, but are not limited to, leaf vegetables, fruiting vegetables, flowering crops, fruits, and tubers, among others. The system 100 are configured to grow a single crop or plant type at a time or grow multiple crop or plant types concurrently.

The system 100 also includes additional conveyance systems, such as a central processing system 130, for moving the grow towers in a circuit or pathway within the system 100 throughout the crop or plant growth cycle. The central processing system 130 includes one or more conveyance mechanisms for directing grow towers to stations for loading plant plugs into, and harvesting crops from, the grow towers. For example, the central processing system 130 includes a harvester station 108, a washing station, 112, and a transplanter station 114. The harvester station 108 removes crops from the grow towers and deposits harvested crops into food-safe containers which may then be conveyed to post-harvest facilities (e.g. preparation, washing, packaging, storage, etc.).

In the illustrated embodiment, various stations of the central processing system 130 operate on grow towers disposed in a horizontal orientation. A pick-up station 118, and associated control logic, includes a robot operable to releasably grasp a grow tower oriented horizontally from a loading location, rotate the grow tower into a vertical orientation, and attach the grow tower to a transfer station for insertion into a selected grow line 102 of the growing chamber 120. At the other end of the growing chamber 120, a laydown station 116, and associated control logic, is operable to releasably grasp and move a vertically oriented grow tower from a buffer region, rotate the grow tower to a horizontal orientation, and position the grow tower on a conveyance system for loading into the harvester station 108. The stations 118, 116 each include a robotic arm, such as a six-degree of freedom robotic arm with end effectors for grasping the grow towers.

The growing chamber 120 also includes automated loading and unloading mechanisms for inserting grow towers into selected grow lines 102 and unloading grow towers from the grow lines 102. In one implementation, a load transfer conveyance mechanism 104 includes a powered and free conveyor system that conveys carriages loaded with grow towers from the pick-up station 118 to a selected grow line 102. The load transfer conveyance mechanism 104 also includes one or more actuators that push the grow towers onto a grow line 102. Similarly, an unload transfer conveyance mechanism 106 includes one or more actuators that push or pull the grow towers from the grow lines 102 into a carriage of another powered or free conveyor mechanism, which conveys the carriages from the grow line 102 to the laydown station 116.

The circuit or pathway includes a staging area for loading the grow towers into and out of the conveyance system 110. The conveyance system 110 within the growing chamber 120 is configured to suspend or otherwise support and translate one or more grow towers along a plurality of grow lines 102. Each grow tower is configured to contain plant growth media that supports a root structure of at least one crop or plant growing therein. The grow towers releasably attach to the grow lines 102 in a substantially vertical orientation and move along the grow lines 102 during a growth phase of the plant. The conveyance system 110 and central processing system 130 are arranged in a production circuit under the control of one or more computing and/or control systems.

The growing chamber 120 includes light emitting sources positioned at various locations along and between the grow lines 102 of the conveyance system 110. The light emitting sources can be positioned laterally relative to the grow towers in the grow lines 102 and configured to emit light toward faces of the grow towers that include openings from which the plants grow. In one example, the light emitting sources are light emitting diodes (LED). The light emitting sources are a plurality of LEDs arranged in a bar-like structure which is positioned in a vertical orientation to emit light laterally along an entire length of the grow tower. Multiple LED light bar structures are arranged in the growing chamber 120 along and between the grow lines 102. Other lighting configurations are also contemplated. For example, the LED light bar structures may be arranged horizontally between the grow lines 102. In certain embodiments, the LED light bar structures are water-cooled.

The growing chamber 120 also includes a nutrient supply system configured to supply an aqueous crop nutrient solution to the crops disposed in the grow towers as the grow towers translate through the growing chamber 120. The nutrient supply system provides an aqueous crop nutrient solution to a top of the grow towers and gravity causes the nutrient solution to travel down the vertically-oriented grow towers to the crops disposed along a length of the grow towers.

The growing chamber 120 also includes an airflow source which is configured to direct airflow in a direction lateral to growth of the crops and through an under-canopy of each plant to disturb a boundary layer of the under-canopy of the plant. In another implementation, airflow is directed from the top of the canopy or orthogonal to the direction of plant growth. The growing chamber 120 also includes a control system and associated sensors for regulating at least one growing condition, such as air temperature, airflow velocity, relative air humidity, and ambient carbon dioxide gas content. The control system may further include sub-systems such as HVAC units, chillers, fans, and associated ducting and air handling apparatus.

The grow towers include various identifying attributes, such as bar codes or radio frequency identification (RFID) tags, to enable sensing and location detection of each grow tower. The system 100 includes corresponding sensors and programming logic for tracking the grow towers during various stages of the crop production cycle and for controlling one or more conditions of the growth environment. The operation of the controls systems and the length of time the grow towers remain in the growth environment can vary depending on a variety of factors, such as crop type, desired crop maturity, and the like.

In operation, grow towers, with newly transplanted crops or seedlings disposed therein, are transferred from the central processing system 130 into the conveyance system 110. The conveyance system 110 moves the grow towers to predefined positions along respective grow lines 102 within the growing chamber 120 in a controlled manner. Within the growing chamber 120, the crops disposed in the grow towers are exposed to the controlled conditions of the growth environments, such as light, temperature, humidity, airflow, nutrient supply, etc. The control systems of the controlled environment agriculture system 100 are capable of automated adjustments to the growth environment to improve growing conditions and improve various crop attributes, such as crop yields, crop visual appeal, and crop nutrient content. When the crops are ready for harvesting, the grow towers are transferred from the conveyance system 110 to the central processing system 130 for harvesting and other processing operations.

Figure 2:
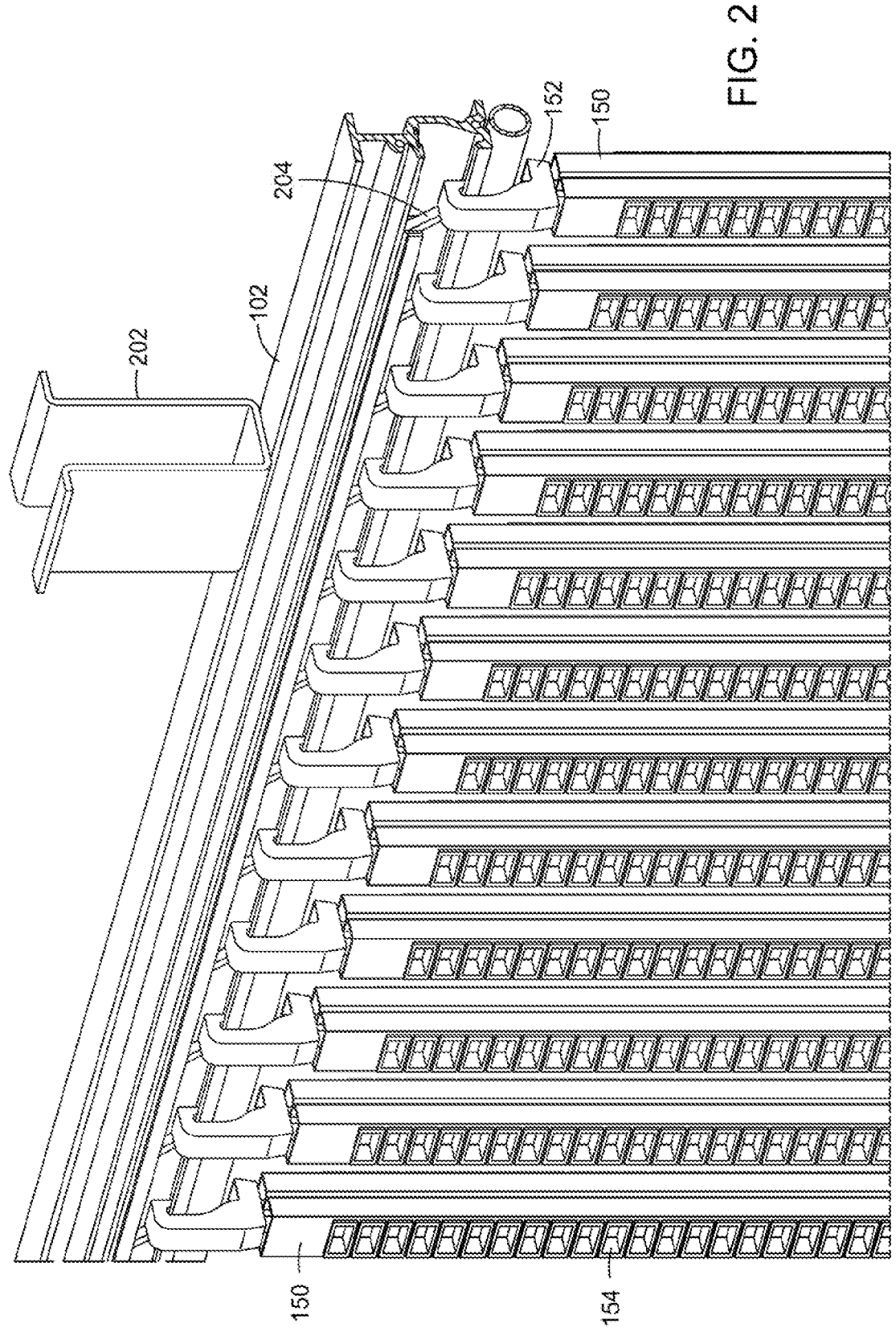
FIG. 2 illustrates a perspective view of a portion of a grow line with grow towers according to an embodiment of the disclosure.

FIG. 2 illustrates a perspective view of a portion of the grow line 102 with the grow towers 150 according to an embodiment of the disclosure. As illustrated, a plurality of the grow towers 150 are arranged in parallel along the grow line 102. Each grow tower 150 includes a plurality of grow sites 154 distributed along opposing faces of the grow tower 150. In operation, the transplanter station 114 transplants seedlings into empty grow sites 154 of the grow towers 150 where the seedlings remain and mature until the plant is ready for harvesting. The grow line 102 supports the plurality of grow towers 150 and the grow line 102 is supported by a bracket 202 which is coupled to a superstructure, such as a frame or a facility structure. Hooks 152 couple the grow tower 150 to the grow line 102 and support the grow towers 150 in a vertical orientation as the grow towers 150 are translated along the grow line 102. A conveyance mechanism 204 engages the hooks 152 to enable movement of the grow towers 150 along the grow line 102.

Figure 3:
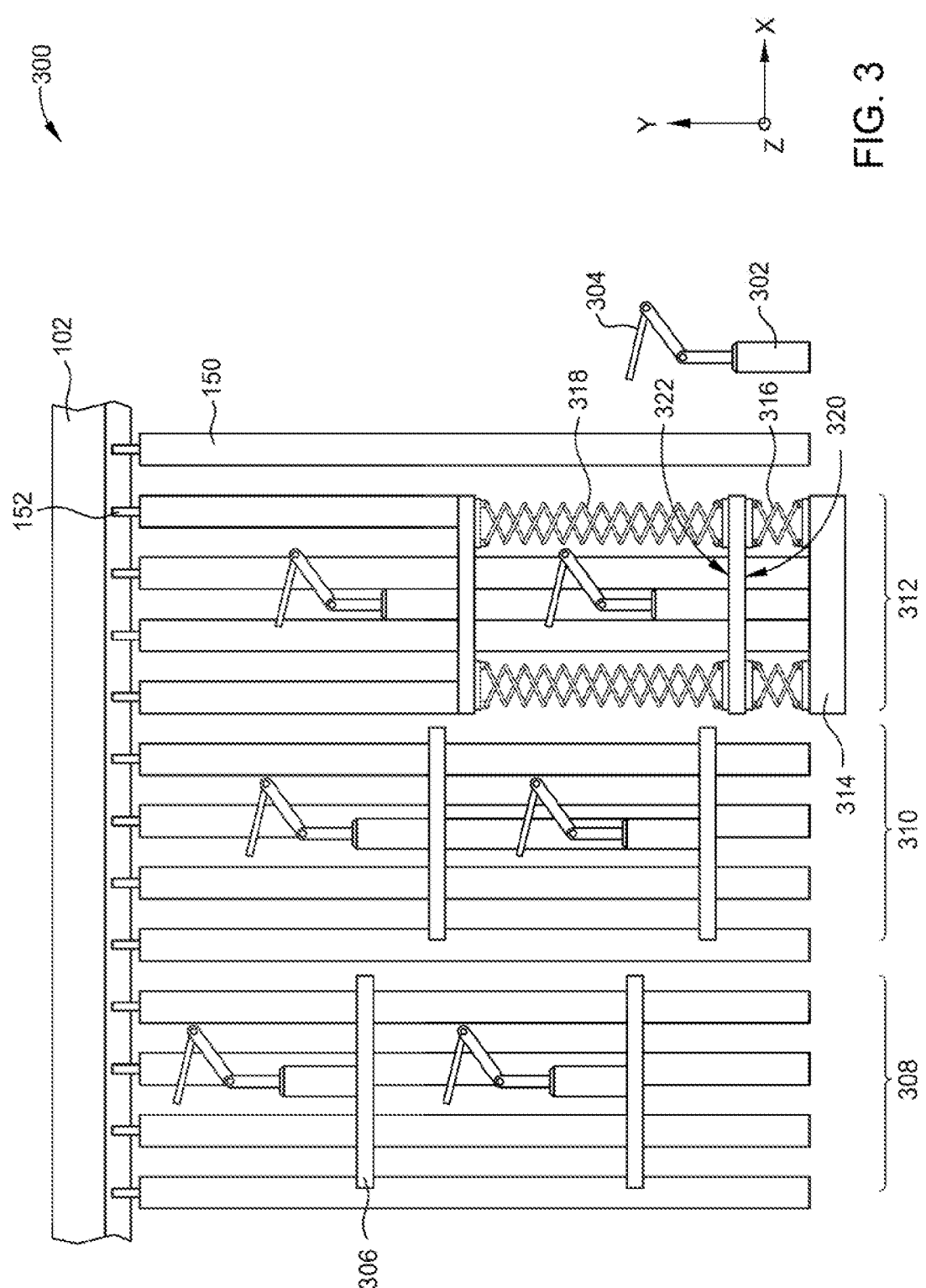
FIG. 3 illustrates a side view of vertical harvesting system according to an embodiment of the disclosure.

FIG. 3 illustrates a side view of vertical harvesting system 300 according to an embodiment of the disclosure. The system 300 includes the grow line 100 and the grow towers 150 coupled to the grow line 102. The system 300 also includes a plurality of platforms 306 and one or more robots 302 disposed on the platforms 306. In one embodiment, a single robot 302 is disposed on each platform 306. Alternatively, a plurality of robots 302 are disposed on a single platform 306. In operation, grow towers 150 traverse along the grow line 102 in the X-direction and pass across the platforms 306 and the robots 302 which are utilized to harvest plants or fruit from the grow towers 150. While the system 300 is illustrated as being disposed along a single face or the grow towers 150, the system 300 may include platforms 306 and robots 302 on the opposing face of the grow towers 150 opposite the illustrated face.

The platforms 306 and/or the robots 302 are moveable relative to the grow towers 150 and/or the grow line 102. In one example, each of the platforms 306 are moveable in the Y-direction. In another example, each of the platforms 306 are moveable in the X-direction. Thus, the platforms 306 can be moved relative to the grow towers 150 to ensure sufficient coverage across the grow towers 150 for harvesting. In one embodiment, the robots 302 disposed on the platforms 306 are fixedly coupled to the platforms 306. In another embodiment, the robots 302 are moveably coupled to the platforms 306. For example, the robots 302 may move in the X-direction along the platforms 306.

The platforms 306 are configured to support the robots 302 thereon and include a first surface 320 and a second surface 322 disposed opposite the first surface 320. In one example, the first surface 320 is considered a bottom surface and the second surface 322 is considered a top surface. The robots 302 are coupled to the second surface 322. In another embodiment, the robots 302 are coupled to the first surface 320. In this embodiment the robots 302 are inverted approximately 180 degree from robots which are disposed on the second surface 322. In another embodiment, the robots 302 are disposed on both the first surface 320 and the second surface 322. In one embodiment, the platforms 306 are a scaffold like structure. While the form factor of the platforms 306 may vary, it is contemplated that any suitable supporting structure may be utilized for the platforms 306. For example, a plurality of cables may be coupled to the platforms 306 and suspend the platforms 306 from an overhead superstructure. In this embodiment, winches or other cable manipulation apparatus are implemented to raise and lower the platforms 306.

In one embodiment, a plurality of harvesting regions 308, 310, 312 are included in the harvesting system 300. For example, a first harvesting region 308 includes one or more platforms 306 and one or more robots 302 disposed on the platforms 306. The platforms 306 and robots 302 of the first harvesting region 308 are positioned adjacent to and harvest plants or fruit from an upper region of the grow towers 150. A second harvesting region 310 includes one or more platforms 306 and one or more robots 302 disposed on the platforms 306. The platforms 306 and robots 302 of the second harvesting region 310 are positioned adjacent to and harvest plants or fruit from a middle region of the grow towers 150. A third harvesting region 312 includes one or more platforms 306 and one or more robots 302 disposed on the platforms 306. The platforms 306 and robots 302 of the third harvesting region 312 are positioned adjacent to and harvest plants or fruit from a lower region of the grow towers 150.

The harvesting regions 308, 310, 312 illustrated are exemplary in nature and a greater or lesser number of harvesting regions may be utilized. While each harvesting region 308, 310, 312 is illustrated with two platforms 306 and robots 302, it is contemplated that a greater or lesser number of platforms 306 and robots 302 may be utilized in each harvesting region 308, 310, 312. In one embodiment, each harvesting region 308, 310, 312 utilizes the same number of platforms 306 and robots 302. Alternatively, one or more of the harvesting regions 308, 310, 312 utilizes a different number of platforms 306 and/or robots 302. In one embodiment, a lowermost region of the grow towers 150 is harvested by a robot 302 which is not disposed on a platform 306, but rather the robot 203 is disposed on a floor of the facility housing the harvesting system 300. Various combinations of platforms 306 and/or robots 302 are contemplated to ensure adequate coverage of the grow towers 150 to facilitate complete and efficient harvesting operations.

In one embodiment, the lowermost platform 306 of each harvest region 308, 310, 312 is coupled to a support base 314 by a first lift 316. The support base 314 is only illustrated in the harvest region 312 for the sake of simplicity. The first lift 316 extends from the support base 314 to the first surface 320 of the lowermost platform 306. A second lift 318 extends from the second surface 322 of the lowermost platform 306 to the first surface 320 of the uppermost platform 306. Additional platforms and lifts are contemplated and may be arranged similar to the illustrated platforms 306 and lifts 316, 318.

While the illustrated embodiment depicts a plurality of lifts 316, 318 coupled to a single platform 306, it is contemplated that each platform 306 may utilize a dedicated lifting mechanism. For example, each platform 306 of each harvesting region 308, 310, 312 are coupled to a respective support base 114 and a lifting mechanism extends between the support base 114 and a single platform 306. In this manner, independent movement of platforms 306 is achieved with less complexity or without impacting the movement of other platforms 306 in the harvesting region 308, 310, 312.

Each lift 316, 318 is operable to raise and lower the platform 306 to which the lift 316, 318 is coupled on the first surface 320. For example, the first lift 316 is operable to raise and lower the lowermost platform 306 while the second lift 318 is operable to raise and lower the uppermost platform 306. The lift 316, 318 are any suitable lifting mechanism capable of raising and lowering the platforms 306 and robots 302 disposed on the platforms 306. Examples of lifting mechanisms include, but are not limited to, scissor-type lifts, telescoping lifts, articulating lifts, screw-type lifts, gear-type lifts, and the like. The lifting mechanism is actuated by hydraulic, electric, mechanical, or pneumatic forces, depending upon the desired implementation. Various combinations of lifting mechanisms may be utilized together to account for gross and fine platform movement or fast and slow platform movement.

Each robot 302 includes an arm 304. The arm 304 extends from the robot 302 and includes an end effector configured to harvest a specific type of plant or fruit from the grow towers 150. In one embodiment, the arm 304 is a six degree of freedom arm, which enables rotation, extension, and other movement in each of the X, Y, and Z-directions. In addition to the elevation or position of the platforms 306, the arm 304 increases the range of harvesting coverage for each robot 302.

In an operational embodiment, each platform 306 and each robot 302 of each harvesting region 308, 310, 312 are positioned in a first harvesting position. The grow towers 150 disposed on the grow line 102 are moved into a harvesting position relative to the harvesting regions 308, 310, 312. Harvesting commences with utilization of the robot 302 and arm 304. Various robot harvesting characteristics, such as the utilization of a boustrophedonic harvesting pattern or the like, ensures complete or substantially complete coverage of the grow towers 150. As harvesting continues and the range of the arm 304 approaches its limits, the platform 306 is either raised or lowered to position the robot 302 within range of unharvested regions of the grow towers 150.

The above sequence is repeated until the predetermined harvesting region (e.g. upper, middle, lower) of the grow tower 150 for each harvesting region 308, 310, 312 is completed. In one embodiment, the grow towers 150 remain stationary during harvesting. Alternatively, the grow towers 150 are moved in the X-direction during harvesting. In this embodiment, the grow towers 150 are moved continuously or in a step-wise fashion. The speed of grow tower movement is calibrated to the harvesting efficiency of each robot to ensure substantially all areas of the grow towers 150 are harvested.

In one embodiment, certain regions of the grow towers 150 are harvested exclusively by a robot 302 in a single harvesting region 308, 310, 312. In another embodiment, certain regions are harvested by a plurality of robots 302 in a plurality of harvesting regions 308, 310, 312. For example, middle regions of the grow towers 150 may be harvested by each of the first, second, and third harvesting regions 308, 310, 312, respectively.

FIG. 4 illustrates an end view of a vertical harvesting system 400 according to an embodiment of the disclosure. The system 400 includes a first support column 402 and a second support column 404. The first support column 402 is disposed adjacent to a first face 412 of the grow tower 150 and the second support column 404 is disposed adjacent to a second face 414 of the grow tower 150. The support columns 402, 404 extend vertically with a magnitude similar to the magnitude of the grow tower 150.

In one embodiment, a robot 302 is coupled to the first support column 402. The robot 302 is coupled to the first support column 402 such that the arm 304 is oriented away from the first support column 402 and toward the first face 412 of the grow tower 150. The first support column 402 includes a lifting mechanism similar to those discussed with regard to FIG. 3. In one embodiment, the lifting mechanism is internal to the first support column 402. In another embodiment, the lifting mechanism is external to the first support column 402. A first actuator 408 is coupled to the lifting mechanism of the first support column 402 and the first actuator 408 is configured to move the robot 302 vertically along the first support column 402 in the Y-direction. The first actuator 408 is any suitable type of actuator, such as a mechanical, electric, hydraulic, or pneumatic actuator or the like. In this manner, the robot 302 is raised and lowered along the first face 412 of the grow tower 150 to enable harvesting of plants or fruit from the grow tower 150.

While only a single first support column 402 is illustrated, it is contemplated that a plurality of first support columns 402 are disposed along the grow line 102. Similarly, while only a single robot 302 is illustrated, it is contemplated that a plurality of robots 302 may be coupled to the first support column 402. In another embodiment, one or more robots 302 are coupled to the second support column 404. In this embodiment, the arm 304 of the robots 302 is oriented away from the second support column 404 and toward the second face 414 of the grow tower 150.

In the illustrated embodiment, the platform 306 is coupled to the second support column 404. The platform 306 extends from the second support column 404 toward the second face 414 of the grow tower 150. The platform 306 is sized to support a person performing harvesting tasks or one or more robots 302 disposed on the platform 306. In embodiments utilizing people to perform harvesting tasks, safety railing 406 or other safety and harvesting equipment are coupled to the platform 306.

Similar to the first support column 402, the second support column 404 includes a lifting mechanism which is either internal or external to the second support column 404. A second actuator 410 is coupled to the lifting mechanism of the second support column 404 and the second actuator 410 is configured to move the platform 306, and thus the person or robot 302 on the platform 306, in the Y-direction. The second actuator 410 is any suitable type of actuator, such as a mechanical, electric, hydraulic, or pneumatic actuator or the like. In this manner, the platform is raised and lowered along the second face 414 of the grow tower 150 to enable harvesting of plants or fruit from the grow tower 150.

While only a single second support column 404 is illustrated, it is contemplated that a plurality of second support columns 402 are disposed along the grow line 102. Similarly, while only a single platform 306 is illustrated, it is contemplated that a plurality of platforms 306 may be coupled to the second support column 404. The robots 302 or platforms 306 (which may include robots 302 disposed thereon) may be utilized in any desired configuration with the support columns 402, 404.

In one operational embodiment, the grow towers 150 traverse the grow line 102 while the support columns 402, 404 remain stationary. In this embodiment, the grow towers 150 move continuously or in a step-wise manner. In another operational embodiment, the support columns 402, 404 move relative to the grow towers 150, which are either moving or stationary.

While the embodiments illustrated with respect to FIGS. 3 and 4 are described as being implemented in a plant growing system with vertically oriented towers, it is contemplated that the horizontally oriented grow apparatus disposed in a vertically stacked architecture may also benefit from the embodiments described herein.

Figure 5:
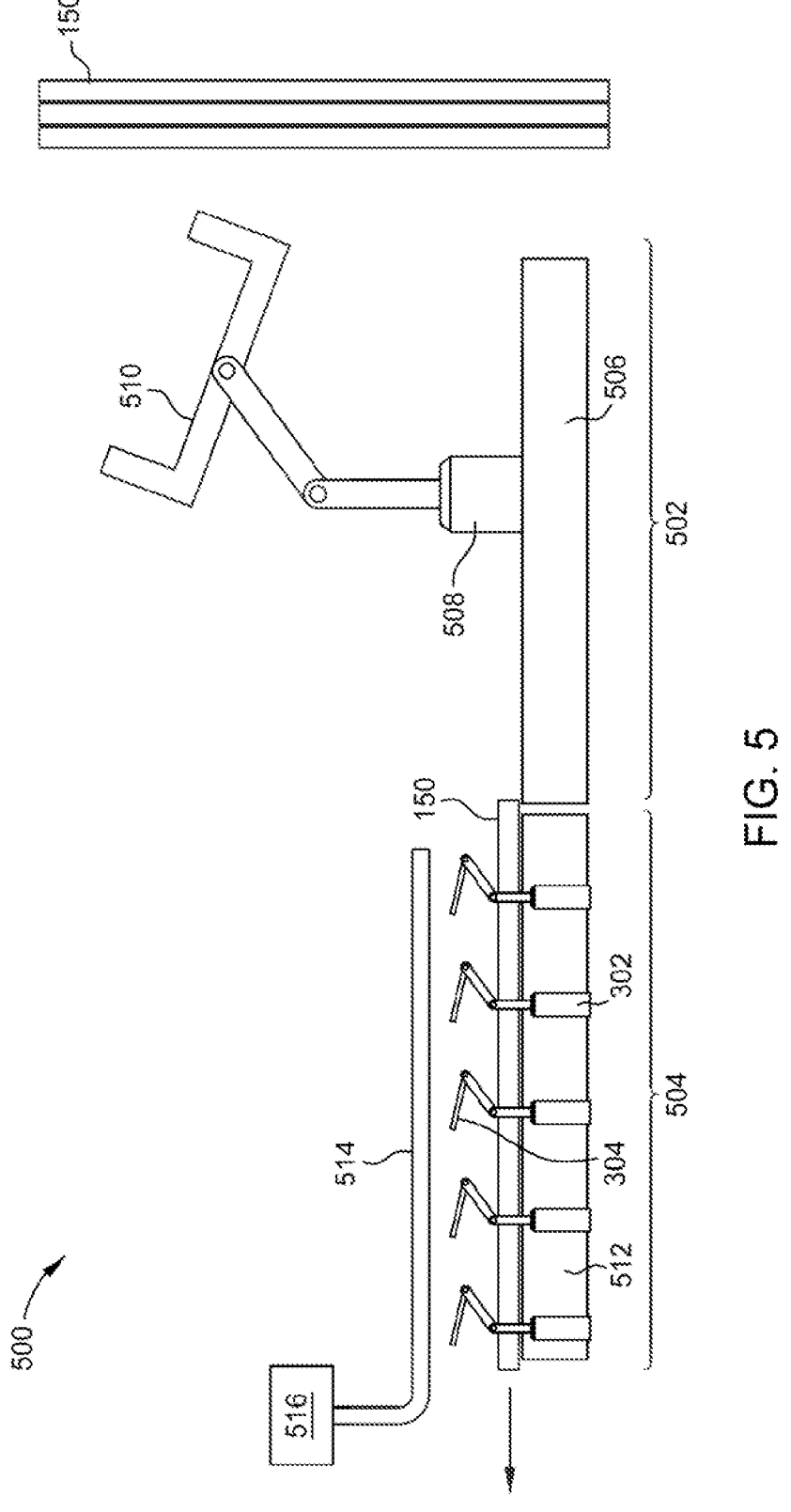
FIG. 5 illustrates a side view of a horizontal harvesting system according to an embodiment of the disclosure.

FIG. 5 illustrates a side view of a horizontal harvesting system 500 according to an embodiment of the disclosure. The system 500 includes a laydown station 502 and a harvesting station 504. Referring back to FIG. 1, the system 500 is implemented within the system 100. For example, the laydown station 502 is utilized in place of the laydown station 116 and the harvesting station 504 is utilized in place of the harvest station 108.

The laydown station 502 includes a robot 508 having an end effector 510 configured to grip and carry the grow towers 150. The robot 508 is disposed on a first track 506 and the robot 508 is moveable along the first track 506. In operation, the robot 508 moves along the first track 506 to a position adjacent to the grow towers 150. The end effector 510 of the robot 508 engages a grow tower 150 in a vertical position from the unload transfer conveyance mechanism 106 and the robot moves along the first track 506 to a position where the robot 508 unloads the grow tower 150 on a second track 512 in the harvesting station. The grow tower 150 is positioned on the second track 512 in a substantially horizontal orientation.

The harvesting station 504 includes the second track 512 and one or more robots 302. In the illustrated embodiment, the robots 302 are positioned on a single side of the second track 512. In another embodiment, the robots 302 are positioned on opposite sides of the second track 512 and face one another. In this embodiment, the robots 302 are offset from one another or substantially aligned with one another across the second track 512. It is also contemplated that human produce harvesters may be utilized in place of the robots 302. The second track 512 is any apparatus suitable for transferring the grow tower 150 through the harvesting station 504. In one example, the second track is a conveyor belt or roller belt along which the grow tower 150 is guided during harvesting. Each of the robots 302 in the harvesting station 504 includes end effectors 304 selected to harvest plants or fruit depending upon the type of plant or fruit being harvested. In embodiments where the grow tower 150 has a single face with plants, that face is oriented upwards and facing the end effectors 304 of the robots 302. In embodiments where the grow towers 150 include plants on opposing faces of the grow tower 150, the grow tower 150 is positioned on its side such that the plant containing faces are oriented toward opposing sides of the second track 512 (e.g. into and out of the paper).

In operation, the grow tower 150 is positioned horizontally on the second track 512 and the robots 302 utilize the end effectors 304 to harvest plants or fruit from the grow tower 150. In one embodiment, the grow tower 150 is maintained in a stationary position during harvesting. In another embodiment, the grow tower 150 is moved in a continuous or step-wise manner during harvesting. Upon completion of the harvest, the grow tower 150 is moved along the second track 512 to the washing station 112 and ultimately to the transplanter station 114.

During harvesting, the robots 302 or human produce harvesters collect harvested produce and a conveyor 514 is utilized to collect harvested produce and convey the produce to a processing station 516. At the processing station 516, the produce is subjected to quality control, washing, packaging, and other processes to prepare the produce for sale and consumption. In one embodiment, the conveyor 514 is a belt conveyor or a roller conveyor configured to transport produce to the processing station 516. In this embodiment, the produce is placed directly on the conveyor 514 or in bins or other containers, which are configured to gather the harvested produce and facilitate conveyance of the produce along the conveyor 514. In another embodiment, the conveyor 514 is a vibratory conveyor which utilizes vibration to transport the produce. In another embodiment, the conveyor 514 is fluid conveyor, which utilizes a jetted flow of liquid to transport the produce. In this embodiment, the conveyor 514 is also configured to wash the produce during transport to the processing station 516. Fluids utilized for the fluid conveyor include, but are not limited to, water, or water with various produce cleaning agents, such as vinegar, sodium chloride, or other suitable produce cleaning liquids.

In the illustrated embodiment, the conveyor 514 is positioned above the second track 512. In this embodiment, harvested produce is collected and placed by the robots 302 or human produce harvesters on the conveyor 514. In another embodiment, the conveyor 514 is disposed internally to the second track 512 and below the grow tower 150. In this embodiment, the second track 512 includes rollers or the like to convey the grow tower 150. The rollers are spaced apart such that harvested produce can pass through openings between the rollers and fall or otherwise land on the conveyor 514. In this embodiment, the conveyor 514 may include a padded conveyor which is configured to eliminate or substantially prevent bruising or damage to the produce upon impact of the produce with the conveyor 514. A fluid conveyor may be implemented in this embodiment to further reduce the probability of bruising or damage to the produce. In this embodiment, a depth of the fluid conveyor is sufficient to prevent the produce from "bottoming out" when the produce falls into the fluid conveyor. Because produce has the propensity to exhibit buoyancy and float when placed in a liquid, the fluid conveyor is contemplated for transport of produce in a manner which reduces damage to the produce.

Figure 6:
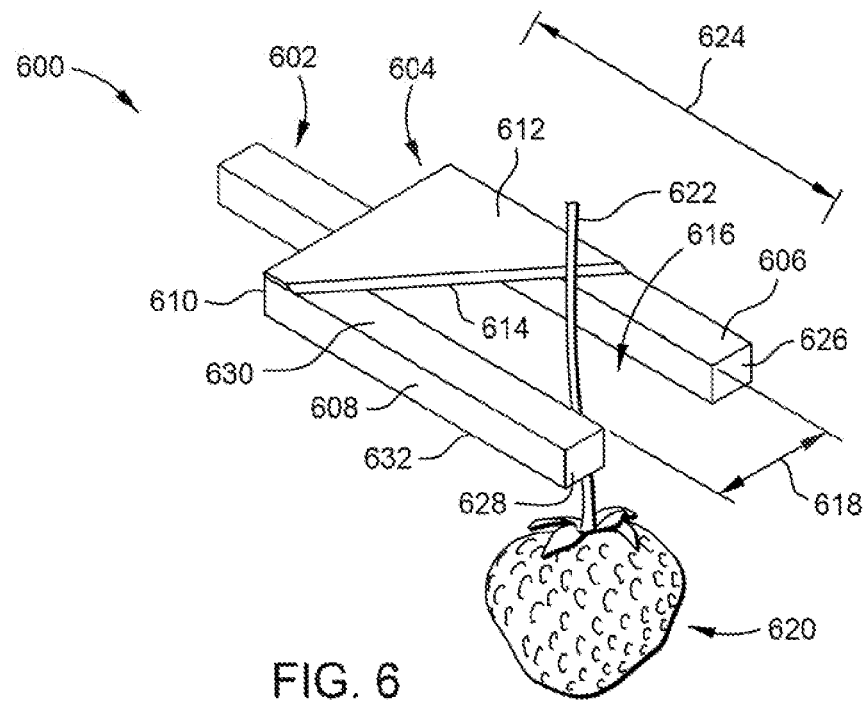
FIG. 6 illustrates a perspective view of a harvesting tool according to an embodiment of the disclosure.

FIG. 6 illustrates a perspective view of a harvesting tool 600 according to an embodiment of the disclosure. In one embodiment, the harvesting tool 600 is implemented as the end effector for the robots 302 of the systems 300, 400, 500. The tool 600 includes a body 604 and a coupling portion 602 extending from the body 604. The coupling portion 602 is a shaft, rod, joint, bar, stem, link or other suitable apparatus configured to interface with the robot arm 304 and function as a harvesting tool end effector. In one embodiment, the coupling portion 602 and the body 604 are fabricated from the same material. In another embodiment, the coupling portion 602 and the body are fabricated form different materials. Examples of suitable materials for fabrication of the body 604 and the coupling portion 602 include, but are not limited to, metallic materials such as steel materials, aluminum materials, and combinations and alloys thereof. Other suitable materials include polymeric materials, such as plastic materials. Ceramic materials may also be utilized depending upon the desired application. Various combinations of the aforementioned materials are also contemplated.

The body 604 includes a base member 610, a first arm 606, a second arm 608, and a blade 612. The coupling portion 602 extends from the base member 610 in a first direction and the arms 606, 608 extend from the base member 610 in a second direction opposite the first direction. In one example, a major axis of the base member 610 is oriented perpendicular to major axes of the coupling portion 602 and the arms 606, 608. The first arm 606 is coupled to and extends from a first end of the base member 610 and the second arm 608 is coupled to and extends from a second end of the base member 610 opposite the first end. The arms 606, 608 have a substantially quadrilateral or tubular cross-section. However, other shapes and morphologies may be utilized.

In one embodiment, the base member 610 and the arms 606, 608 are individual elements coupled together by fastening members, such as screws, bolts, and rivets or the like. In this embodiment, the base member 610 and the arms 606, 608 are fabricated from the same material or may be fabricated from different materials. In another embodiment, the base member 610 and the arms 606, 608 form a unitary structure. In this embodiment, the base member 610 and the arms 606, 608 are either initially formed as a unitary member or the arms 606, 608 are welded to the base member 610 to form a unitary member. For example, if a metallic or polymeric material is utilized for both the base member 610 and the arms 606, 608, the arms 606, 608 may be welded to the base member 610 by a metal or plastic weld, respectively.

The first arm 606 extends in a direction normal to the base member 610 and the first arm 606 terminates at a first end 626. Similar to the first arm 606, the second arm 608 extends in a direction normal to the base member 610 and the second arm 608 terminates at a second end 628. In one embodiment, the first arm 606 and the second arm 608 are substantially parallel to one another. A length 624 of the arms 606, 608 is between about 1 inch and about 12 inches. However, it is contemplated that the length 624 may be longer or shorter depending upon the type or fruit or plant being harvested and harvesting characteristics of the robot 302. In one embodiment, the length 624 of each of the arms 606, 608 is the same or substantially the same. In this embodiment, the first end 626 and the second end 628 are disposed in the same or substantially the same plane. In another embodiment, the length 624 of each of the arms 606, 608 is different. In this embodiment, the first end 626 and the second end 628 are disposed in different planes.

The arms 606, 608 define an opening 616 therebetween having a width 618. The width 618 is between about 0.5 inches and about 6 inches. However, it is contemplated that a wider or narrower opening may be utilized depending upon they type of fruit or plant being harvested and harvesting characteristics of the robot 302. The blade 612 is coupled to the body 610 and an edge 614 of the blade 612 extends across the opening 616. In the illustrated embodiment, the blade 612 is coupled to the base member 610, the first arm 606 and the second arm 608. In one embodiment, the blade 612 is coupled to the base member 610. In another embodiment, the blade 612 is coupled to the first arm 606 and the second arm 608.

In one embodiment, the edge 614 of the blade 612 is angled across the opening 616 relative to a major axis of the base member 610. In this embodiment, the position of the edge 614 at the first arm 606 is different from the position of the edge 614 at the second arm 608. The angled nature of the edge 614 is believed to increase cutting efficacy and provide a pinch point between the edge 614 and the second arm 608 to ensure cutting of plants or fruit. In an alternative embodiment, the edge 614 of the blade 612 is substantially parallel to a major axis of the base member 610. The edge 614 of the blade 612 is a straight edge, serrated edge, scalloped edge, or other suitable morphology configured to enhance plant or fruit harvesting characteristics.

In the illustrated embodiment, the blade 612 is coupled to a top surface 630 of the arms 606, 608. Alternatively, the blade 612 may be coupled to a bottom surface 632 of the arms 606, 608. In another embodiment, multiple blades 612 are coupled to the body 604. In this embodiment, a first blade is coupled to the top surface 630 and a second blade is coupled to the bottom surface 632. The edges of the blades in this embodiment may mirror one another may be oriented inverse to one another. In embodiments utilizing multiple blades, the blades may be configured to move relative to one another, for example, in a scissor like motion or an oscillatory or vibratory motion. In other embodiments, which may include a single or multiple blades, the blades may rotate or spin. For example, a single blade may be configured to a circular saw blade and the blade may be coupled to the base member 610 and configured to spin around an axis. As described herein, various blade types, whether stationary or moveable, may be implemented to facilitate harvesting of produce.

In operation, fruit 620 growing on a stem 622 is harvested by the harvesting tool 600. In the illustrated embodiment, the fruit 620 is a strawberry, however, it is contemplated that other types of fruit, plants or vegetables, with similar characteristics may be harvested by the harvesting tool 600. Examples of other fruits which may be harvested by the tool 600 include, but are not limited to, apples, pears, grapes, cherries, blueberries, raspberries, huckleberries, plums, tomatoes, zucchini, squash, various leafy vegetables, and the like.

In one embodiment, the robot 302 includes apparatus and software to support computer vision harvesting operations. For example, the robot 302 may utilize one or more cameras and/or sensors to identify fruits, plants, or vegetables which are ready for harvesting. The cameras and/or sensors generate information which is analyzed by the software to select fruit, plants, or vegetables for harvesting and the software is utilized to control the robot 302 to facilitate harvesting operations. In an alternative embodiment, the robot 302 utilizing the harvesting tool 600 may be controlled by a person operating the robot 302. In another embodiment, the harvesting tool 600 is configured for and utilized by a person for harvesting without the robot 302.

In one embodiment, the harvesting tool 600, which is coupled to the arm 304 of the robot 302 as an end effector, is positioned such that the stem 622 is aligned with the opening 616. The harvesting tool 600 is moved relative to the stem 622 such that the stem 622 enters the opening 616 between the arms 606, 608. As the tool 600 continues moving relative to the stem 622, the stem 622 is contacted and cut by the edge 614 of the blade 612. In one embodiment, the tool 600 is moved in a direction substantially normal to a major axis of the stem 622. The velocity of the arm 304 guiding the tool 600 is selected to ensure accurate positioning of the stem 622 between the arms 606, 608 during alignment for harvesting. In one embodiment, when the stem 622 is positioned between the arms 606, 608, the velocity of the arm 304 is increased to improve cutting of the stem 622 by the blade 612. It is contemplated that other characteristics of the robot 302 may be modulated to facilitate efficient harvesting without damage to the fruit, plant, or vegetable.

Figure 7:
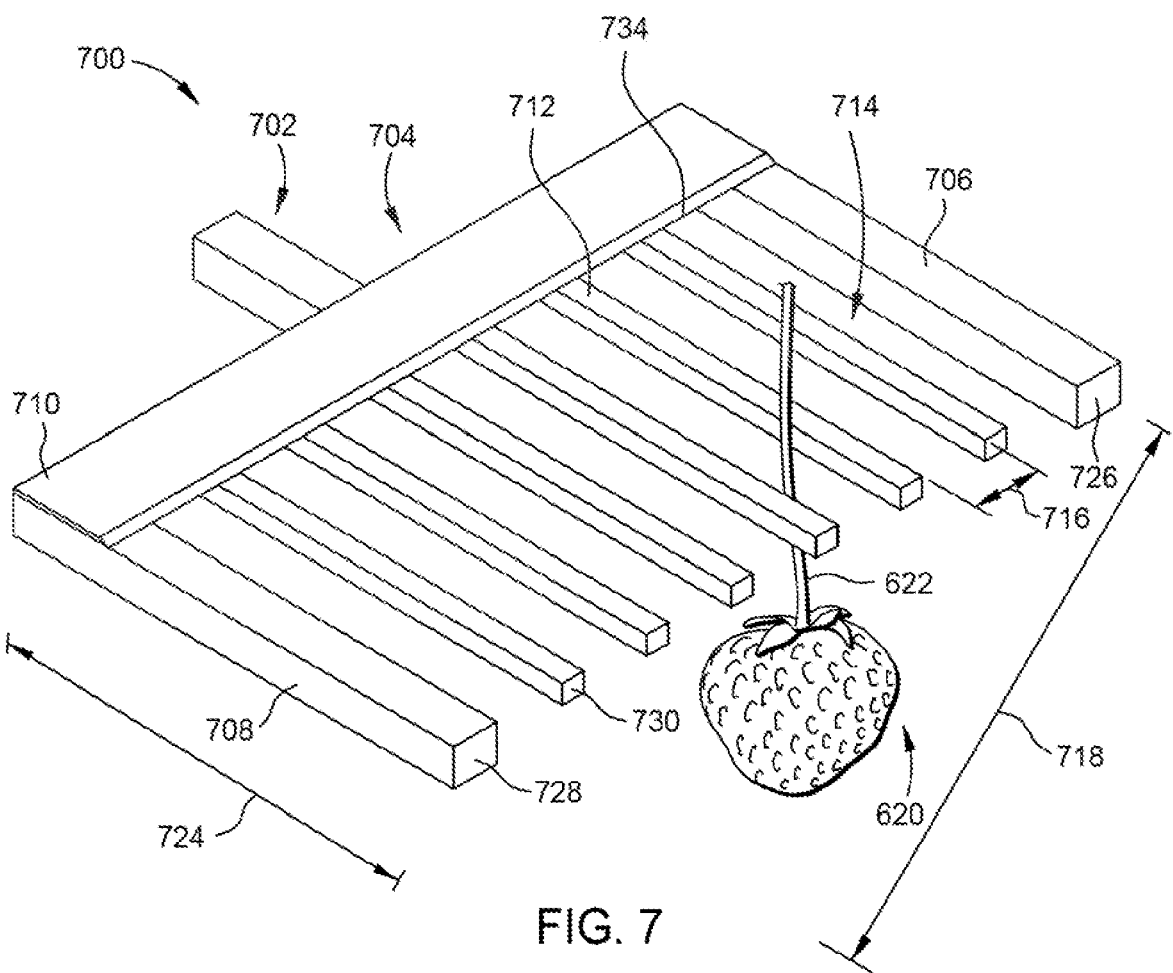
FIG. 7 illustrates a perspective view of a harvesting tool according to an embodiment of the disclosure.

FIG. 7 illustrates a perspective view of a harvesting tool 700 according to an embodiment of the disclosure. In one embodiment, the harvesting tool 700 is implemented as the end effector for the robots 302 of the systems 300, 400, 500. The tool 700 includes a body 704 and a coupling portion 702 extending from the body 704. The coupling portion 702 is a shaft, rod, joint, bar, stem, link or other suitable apparatus configured to interface with the robot arm 304 and function as a harvesting tool end effector. In one embodiment, the coupling portion 702 and the body 704 are fabricated from the same material. In another embodiment, the coupling portion 602 and the body are fabricated form different materials. Examples of suitable materials for fabrication of the body 704 and the coupling portion 702 include, but are not limited to, metallic materials such as steel materials, aluminum materials, and combinations and alloys thereof. Other suitable materials include polymeric materials, such as rubber-like or plastic-like materials. Ceramic materials may also be utilized depending upon the desired application. Various combinations of the aforementioned materials are also contemplated.

The body 704 includes a base member 710, a first arm 706, a second arm 708, and a plurality of fingers 712. The coupling portion 702 extends from the base member 710 in a first direction and the arms 706, 708 extend from the base member 710 in a second direction opposite the first direction. In one example, a major axis of the base member 710 is oriented perpendicular to major axes of the coupling portion 702 and the arms 706, 708. In one embodiment, an edge 734 of the base member 710 is sharpened or similar to a blade. In this embodiment, the edge 734 is utilized similar to the blade 614 and edge 614 described with regard to FIG. 6.

The first arm 706 is coupled to and extends from a first end of the base member 710 and the second arm 708 is coupled to and extends from a second end of the base member 710 opposite the first end. The arms 706, 708 have a substantially polygonal, quadrilateral, or tubular cross-section. However, other shapes and morphologies may be utilized. In one embodiment, the arms 706, 708 are substantially solid. In another embodiment, the arms 706, 708 are hollow.

In one embodiment, the base member 710 and the arms 706, 708 are individual elements coupled together by fastening members, such as screws, bolts, and rivets or the like. In this embodiment, the base member 710 and the arms 706,

708 are fabricated from the same material or may be fabricated from different materials. In another embodiment, the base member 710 and the arms 706, 708 form a unitary structure. In this embodiment, the base member 710 and the arms 706, 708 are either initially formed as a unitary member or the arms 706, 708 are welded to the base member 710 to form a unitary member. For example, if a metallic or polymeric material is utilized for both the base member 710 and the arms 706, 708, the arms 706, 708 may be welded to the base member 710 by a metal or plastic weld, respectively.

The first arm 706 extends in a direction normal to the base member 710 and the first arm 706 terminates at a first end 726. Similar to the first arm 706, the second arm 708 extends in a direction normal to the base member 710 and the second arm 708 terminates at a second end 728. In one embodiment, the first arm 706 and the second arm 708 are substantially parallel to one another. A length 724 of the arms 706, 708 is between about 1 inch and about 12 inches. However, it is contemplated that the length 724 may be longer or shorter depending upon the type or fruit or plant being harvested and harvesting characteristics of the robot 302. In one embodiment, the length 724 of each of the arms 706, 708 is the same or substantially the same. In this embodiment, the first end 726 and the second end 728 are disposed in the same or substantially the same plane. In another embodiment, the length 724 of each of the arms 706, 708 is different. In this embodiment, the first end 726 and the second end 728 are disposed in different planes.

A width 718 between the arms 706, 708 is between about two inches and about 24 inches, however, a larger or smaller width may be utilized depending upon characteristics of the fruit, plant, or vegetable being harvested. The plurality of fingers 712 extend from the base member 710 between the arms 706, 708. In one embodiment, the plurality of fingers 712 are substantially parallel to the arms 706, 708. In another embodiment, each of the plurality of fingers 712 are parallel to one another. The plurality of fingers 712 have a substantially polygonal, quadrilateral, or tubular cross-section, however, other shapes and morphologies are contemplated. In one embodiment, each of the fingers 712 are substantially solid. In another embodiment, each of the fingers 712 is hollow. Each of the fingers 712 of the plurality at least partially defines an opening 714. The openings 714 between the fingers 712 or between the fingers 712 and the arms 706, 708 have a width 716 which is selected, at least in part, upon the type of fruit, plant, or vegetable being harvested. In one example, the width 716 of the openings 714 is between about 0.125 inches and about 6 inches, such as between about 0.25 inches and about 4 inches, such as between about 0.5 inches and about 2 inches.

In one embodiment, each finger 712 of the plurality of fingers 712 has the same length or substantially the same length and extends the same distance or substantially the same distance from the base member 710. In another embodiment, one or more fingers 712 of the plurality of fingers 712 have a length which is different from other fingers 712 of the plurality of fingers 712. In the illustrated embodiment, a length of the fingers 712 is less than the length 724 of the arms 706, 708. In another embodiment, the length of the fingers 712 is greater than the length 724 of the arms 706, 708. In both of the aforementioned embodiments, ends 730 of the fingers 712 are disposed in a plane different than a plane of the first end 726 and the second end 728. In another embodiment, the ends 730 of the fingers 712 are disposed in the same or substantially the same plane as of the first end 726 and the second end 728.

In one embodiment, the base member 710, the first arm 706, the second arm 708, and fingers 712 are fabricated from a material, such as a polymeric material or the like, which exhibits a relatively low degree of elasticity and is not easily deformed. In operation, as the tool 700 is utilized to harvest fruit, plants, or vegetables, the tool 700 is positioned such that the stem 622 of the fruit 620 is located within one of the openings 714. The tool 700 is then moved in a direction substantially normal to a major axis of the stem 622 or parallel to a major axis of the stem 622. The fruit 620 has a width which is greater than the width 716 of the openings 714 and force applied upon the fruit 620 by the fingers 712 and/or arms 706, 708 causes the fruit 620 to be separated from the stem 622, thus enabling harvesting of the fruit 620.

In another embodiment, the base member 710, the first arm 706, and the second arm 708 are fabricated from a material, such as a polymeric material or the like, which exhibits a relatively low degree of elasticity. The fingers 712 are fabricated from a material, such as a polymeric material, for example, rubber or the like, which exhibits as greater degree of elasticity when compared to the material utilized to fabricate the base member 710, first arm 706, and second arm 708. In one embodiment, the type of material and the degree of elasticity of the material utilized for the fingers 712 are selected, at least in part, based upon the type of fruit, plant, or vegetable being harvested.

In the illustrated example, strawberry fruit 620 is harvested by the tool 700. The tool 700 is moved in a direction substantially normal to a major axis of the stem 622 or parallel to a major axis of the stem 622. Ripe strawberries with stems 622 positioned in the openings 714 are contacted by the fingers 712 and because the strawberries are ready for harvesting, the force applied by the fingers 712 upon the strawberries is sufficient to remove the strawberry fruit 620 from the stem 622. In other words, the fingers 712 do not deform to such as degree as to widen the opening 714 and allow for the fruit 620 to pass through the opening still attached to the stem 622. However, unripe strawberries which are subjected to the same process may not be removed from the stems 622 because the fingers 712 will deform as the fingers 712 apply pressure to the fruit 620 and the fruit 620 will pass through the openings 714 still attached to the stems 622. As such, harvesting efficiency and ripe fruit yield may be increased because the harvesting tool 700 is ripe/unripe agnostic and selection of ripe fruit by the robot 302 is potentially reduced or eliminated.

The tools 600, 700 described herein are contemplated as being implemented as end effectors for the robots 302 of the systems 300, 400, 500. In other examples, other types of tool are utilized as end effectors for the robots 302. In one embodiment, a scissor-like tool is utilized as an end effector for the robots 302 which is capable us cutting or snipping stems of fruit or plants to be harvested. In another embodiment, an air blaster or the like is utilized as an end effector for the robots 302. In this embodiment, the end effector includes a nozzle as associated fluid conduit to deliver a stream of pressurized gas to the fruit to be harvested. The stream of pressurized gas contacts the fruit with sufficient force to remove the fruit from the stem without damaging the fruit. In another embodiment, a suction tool or the like is utilized as an end effector for the robots 302. In this embodiment, a suction cup or other suction gripping tool is in fluid communication with a vacuum source which enables the suctions tool the engage and pull fruit from the plants. In yet another embodiment, a cauterizer is utilized as an end effector for the robots 302. In this embodiment, the cauterizer utilizes one or more electrodes to generate heat and cauterize the stem of the plant to remove the fruit. Various different type of end effector tools may be advantageously implemented in accordance with the embodiments described herein depending upon the type of fruit to be harvested and other harvesting variables.

Exemplary implementations of the disclosure are described herein and may be combined with one another without further recitation.

In one implementation, a harvesting system includes a grow line, one or more towers coupled to the grow line and moveable along the grow line, a plurality of platforms disposed adjacent to the grow towers, and one or more robots disposed on each of the platforms.

The system according to any one of the previous implementations wherein a major axis of the one or more towers is oriented vertically.

The system according to any one of the previous implementations and further comprising a plurality of harvesting regions, each harvesting region comprising one or more of the platforms and one or more of the robots disposed on each of the one or more platforms.

The system according to any one of the previous implementations wherein each robot of each harvesting region is configured to process a different region of the one or more towers.

The system according to any one of the previous implementations wherein each harvesting region comprises two or more platforms.

The system according to any one of the previous implementations wherein the two or more platforms are vertically aligned within the harvesting region.

The system according to any one of the previous implementations wherein a first platform of the plurality of platforms is coupled to a support base by a first lift.

The system according to any one of the previous implementations wherein a second platform of the plurality of platforms is coupled to the first platform by a second lift.

The system according to any one of the previous implementations wherein the first lift is a scissor-type lift, telescoping lift, articulating lift, screw-type lift, gear-type lift or cable suspended lift.

The system according to any one of the previous implementations wherein the second lift is a scissor-type lift, telescoping lift, articulating lift, screw-type lift, gear-type lift, or cable suspended lift.

The system according to any one of the previous implementations wherein the one or more robots harvest produce from the one or more grow towers in a substantially boustrophedonic harvesting pattern.

In another implementation, a harvesting system includes a grow line having a plurality of vertically oriented grow towers coupled to the grow line, a first plurality of platforms positioned adjacent to a first region of the grow line, each platform of the first plurality of platforms having one or more first robots disposed thereon, a second plurality of platforms positioned adjacent to a second region of the grow line, each platform of the second plurality of platforms having one or more second robots disposed thereon, a third plurality of platforms positioned adjacent to a third region of the grow line, each platform of the third plurality of platforms having one or more third robots disposed thereon, wherein each robot of the first, second, and third robots are positioned to harvest a different region of the grow towers.

The system according to any one of the previous implementations wherein each plurality of platforms in each region are vertically aligned.

The system according to any one of the previous implementations wherein a first platform of the first plurality of platforms is coupled to a support base by a first lift.

The system according to any one of the previous implementations wherein a second platform of the first plurality of platforms is coupled to the first platform by a second lift.

The system according to any one of the previous implementations wherein a first platform of the second plurality of platforms is coupled to a support base by a first lift.

The system according to any one of the previous implementations wherein a second platform of the second plurality of platforms is coupled to the first platform by a second lift.

The system according to any one of the previous implementations wherein a first platform of the third plurality of platforms is coupled to a support base by a first lift.

The system according to any one of the previous implementations wherein a second platform of the third plurality of platforms is coupled to the first platform by a second lift.

In one implementation, a harvesting system includes a grow line having a plurality of vertically oriented grow towers coupled to the grow line, each grow tower of the plurality having a first face and a second face oriented opposite the first face, a first support column disposed adjacent to the first face of the grow towers, a second support column disposed adjacent to the second face of the grow towers, a first robot coupled to the first support column, and a second robot coupled to the second support column.

The system according to any one of the previous implementations wherein the first support column comprises a first actuator configured to move the first robot vertically along the first support column.

The system according to any one of the previous implementations wherein the second support column comprises a second actuator configured to move the second robot vertically along the second support column.

The system according to any one of the previous implementations wherein each of the first robot and second robot comprise an arm and a harvesting tool end effector coupled to the arm.

In one implementation, a harvesting system includes a grow line having a plurality of vertically oriented grow towers coupled to the grow line, each grow tower of the plurality having a first face and a second face oriented opposite the first face, a first support column disposed adjacent to the first face of the grow towers, a second support column disposed adjacent to the second face of the grow towers, a first platform coupled to the first support column, and a second platform coupled to the second support column.

The system according to any one of the previous implementations and further comprising one or more first robots coupled to the first platform and one or more second robots coupled to the second platform.

The system according to any one of the previous implementations wherein the first support column comprises a first actuator configured to move the first platform vertically along the first support column.

The system according to any one of the previous implementations wherein the second support column comprises a second actuator configured to move the second platform vertically along the second support column.

In one implementation a harvesting tool apparatus includes a body having a base member and at least two arms extending from the base member, the arms defining an opening there between, a coupling portion extending from the base member opposite the arms, and a blade coupled to the body and extending across the opening from a first arm to a second arm of the at least two arms.

The apparatus according to any one of the previous implementations wherein the coupling portion is adapted to interface with an end effector of a robot.

The apparatus according to any one of the previous implementations wherein the blade comprises and edge and the edge is disposed at a non-parallel angle relative to a major axis of the base member.

The apparatus according to any one of the previous implementations wherein the opening has a width of between about 1 inch and about 6 inches.

The apparatus according to any one of the previous implementations wherein the first arm and the second arm are substantially parallel.

The apparatus according to any one of the previous implementations wherein a length of the first arm and a length of the second arm are substantially similar.

The apparatus according to any one of the previous implementations wherein a length of the first arm is different from a length of the second arm.

The apparatus according to any one of the previous implementations wherein a length of the first arm and a length of the second arm is between about 1 inch and about 12 inches.

In one implementation, a harvesting tool apparatus includes a base member, a plurality of arms extending from the base member, the plurality of arms fabricated from a material having a first elasticity, a coupling portion extending from the base member opposite the plurality of arms, and a plurality of fingers extending from the base member and disposed between the plurality of arms, the plurality of fingers fabricated from a material having a second elasticity greater than the first elasticity.

The apparatus according to any one of the previous implementations wherein the coupling portion is adapted to interface with an end effector of a robot.

The apparatus according to any one of the previous implementations wherein the plurality of arms extend substantially the same distance from the base member.

The apparatus according to any one of the previous implementations wherein a width between the plurality of arms is between about 2 inches and about 24 inches.

The apparatus according to any one of the previous implementations wherein a width between the plurality of fingers is between about 0.125 inches and about 6 inches.

The apparatus according to any one of the previous implementations wherein ends of the plurality of arms are disposed in a first plane and ends of the plurality of fingers are disposed in a second plane different from the first plane.

The apparatus according to any one of the previous implementations wherein the plurality of arms and the plurality of fingers have a substantially polygonal or tubular cross-section.

The apparatus according to any one of the previous implementations wherein the plurality of arms and the plurality of fingers are solid.

The apparatus according to any one of the previous implementations wherein the plurality of arms and the plurality of fingers are hollow.

The apparatus according to any one of the previous implementations wherein the plurality of fingers exhibit a greater degree of deformation than the plurality of arms when subjected to an equal amount of force.

In one implementation, a harvesting system includes a first platform coupled to a first lift, the first lift operable in a vertical direction, a first robot disposed on the first platform, the first robot comprising an arm moveable in X, Y, and Z directions, a second platform disposed above the first platform and coupled to a second lift, the second lift operable in the vertical direction, and a second robot disposed on the second platform, the second robot comprising an arm moveable in the X, Y, and Z directions.

The system according to any one of the previous implementations wherein the second lift is coupled to the first platform.

The system according to any one of the previous implementations and further comprising a third platform disposed adjacent to the first platform, the third platform coupled to a third lift, a third robot coupled to the third platform, a fourth platform disposed above the third platform and coupled to a fourth lift, the fourth lift operable in the vertical direction.

The system according to any one of the previous implementations wherein each of the first, second, third, and fourth platforms are disposed in different horizontal planes.

In summation, embodiments of the present disclosure provide for mechanized fruit, plant, and vegetable harvesting. In vertical growing architectures, one or more of platforms, columns, and robots are utilized to facilitate efficient and complete harvesting coverage for vertically disposed grow towers which traverse a grow line. Harvesting robots and systems described herein are also utilized to harvest fruits, plants, or vegetables in a horizontal orientation. Harvesting tools described herein are utilized as robot end effectors and provide for improved harvesting by enabling efficient and selective harvesting of produce.

While the foregoing is directed to embodiments of the present disclosure, other and further embodiments of the disclosure may be devised without departing from the basic scope thereof, and the scope thereof is determined by the claims that follow.

What is claimed is:
1. A harvesting system, comprising:
a grow line;
one or more towers coupled to the grow line and moveable along the grow line;
a first support column extending vertically with a height approximating a height of the one or more grow towers and disposed adjacent to a first face the grow towers and comprising a first lift mechanism, wherein the one or more grow towers are configured to traverse along the grow line and pass the first support column; and
a first robot coupled to the first support column and having an arm oriented away from the first support column and toward the one or more grow towers, wherein the first lift mechanism is configured to move the one or more first robots vertically along the first support column.
2. The system of claim 1, wherein a first actuator is coupled to the first lifting mechanism and configured to move the first robot vertically along the first support column.
3. The system of claim 1, further comprising:
a second support column disposed adjacent to a second face of the grow towers and comprising a second lift mechanism;
a second robot coupled to the second support column and having a second arm oriented away from the second support column and toward the one or more grow towers, wherein the second lift mechanism is configured to move the second robot vertically along the first support column.

4. The system of claim 3, wherein a second actuator is coupled to the second lift mechanism and configured to move the second robot vertically along the second support column.
5. The system of claim 1, wherein the first lift mechanism is internal to the first support column.
6. The system of claim 1, wherein the first lift mechanism is external to the first support column.
7. The system of claim 1, wherein a first support column is configured to move relative to the grow towers.
8. The system of claim 1, further comprising a plurality of first support columns.
9. The system of claim 1, further comprising a plurality of first robots coupled to the first support column.
10. A harvesting system, comprising:
a grow line;
a plurality of vertically oriented grow towers coupled to the grow line and moveable along the grow line;
a plurality of platforms positioned adjacent to the grow line, each platform of the first plurality of platforms having one or more robots disposed thereon, wherein each platform of the plurality of platforms is moveable in a first direction perpendicular to the vertical orientation of the grow towers; and
a lift mechanism coupled to the plurality of platforms and configured to move the plurality of platforms in a second direction parallel to the vertical orientation of the grow towers.
11. The system of claim 10, wherein each robot of the one or more robots is moveable in the first direction.
12. The system of claim 10, wherein each platform comprises a first surface and a second surface disposed opposite the first surface, wherein the one or more robots are disposed on the first surface and the second surface.
13. The system of claim 12, wherein each platform comprises a top surface and a bottom surface disposed opposite the top surface, wherein the one or more robots are disposed on the bottom surface.
14. A harvesting system, comprising:
a grow line;
a plurality of vertically oriented grow towers coupled to the grow line, each grow tower of the plurality of grow towers comprising:
a first face and a second face oriented opposite the first face;
a plurality of grow sites distributed along the first face and the second face;
a plurality of hooks coupling the plurality of vertically oriented grow towers to the grow line;
a conveyance mechanism engaging the plurality of hooks to enable movement of the plurality of vertically oriented grow towers along the grow line;
a first support column disposed adjacent to the first face of the grow towers comprising a first lift mechanism, wherein the first support column is configured to move relative to the grow towers;
a second support column disposed adjacent to the second face of the grow towers comprising a second lift mechanism, wherein the second support column is configured to move relative to the grow towers;
a first robot coupled to the first support column and having an arm oriented away from the first support column and toward the one or more grow towers, wherein the first lift mechanism is configured to move the one or more first robots vertically along the first support column; and a second robot coupled to the second support column and having a second arm oriented away from the second support column and toward the one or more grow towers, wherein the second lift mechanism is configured to move the second robot vertically along the first support column.

15. The system of claim 14, wherein the first support column comprises a first actuator configured to move the first robot vertically along the first support column, the second support column comprises a second actuator configured to move the second robot vertically along the second support column.

\* \* \* \* \*